July 10, 1928.
T. ZUSCHLAG
1,676,847
METHOD AND APPARATUS FOR EXPLORING SUBTERRANEAN STRATA
Filed Jan. 18, 1927
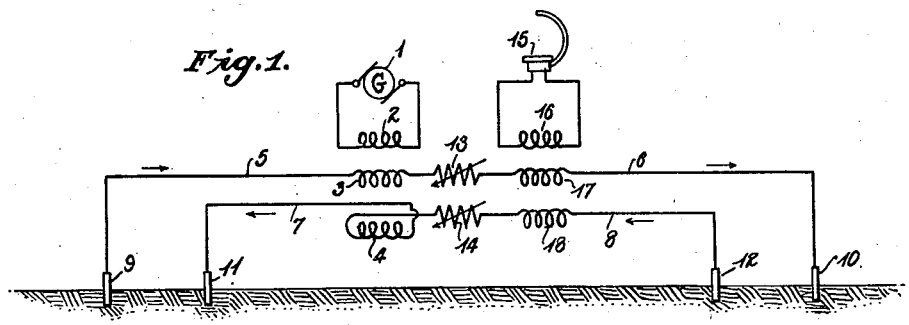
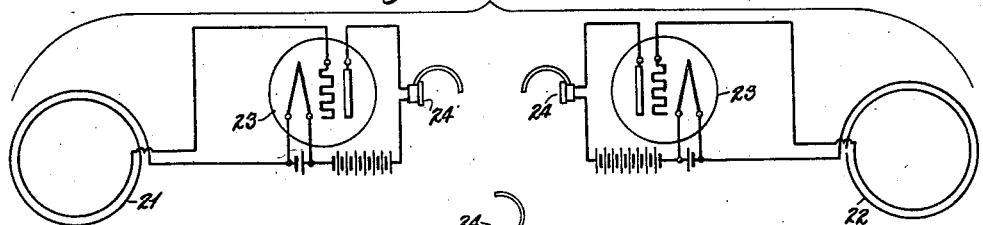
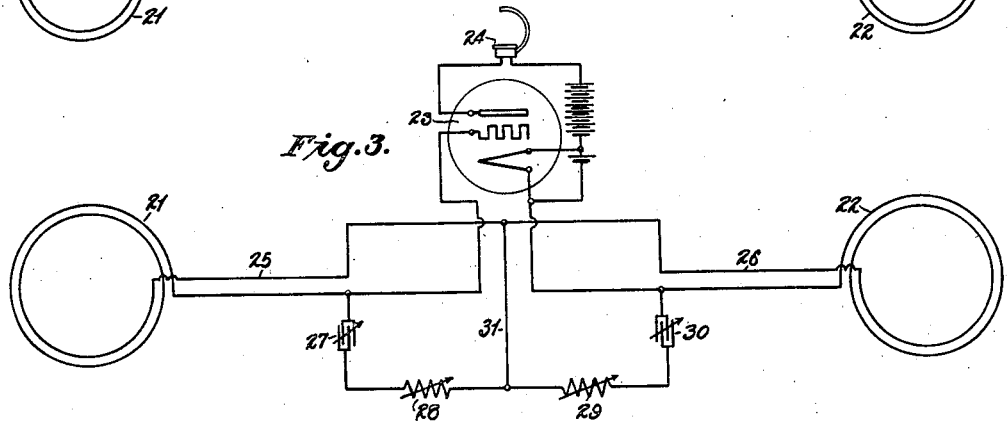
INVENTOR.
Theodor Zuschlag
BY
ATTORNEYS Patented July 10, 1928.

1,676,847

UNITED STATES PATENT OFFICE.

THEODOR ZUSCHLAG, OF NEW YORK, N. Y., ASSIGNOR TO THE TAUMAC CORPORATION, OF NEW YORK, N. Y., A CORPORATION OF NEW YORK.

METHOD AND APPARATUS FOR EXPLORING SUBTERRANEAN STRATA.

Application filed January 18, 1927. Serial No. 161,880.

My invention relates to the art of detecting and locating subterranean ore-bodies, salt domes, faults, etc., by generating subterranean electric currents and observing the characteristics of their resulting magnetic fields at different points.

It is known that the characteristics of such fields will be modified by variations in conductivity and permeability of the various ores, rocks, etc. of the earth's crust, and that these modifications may be detected by suitable instruments under, at or below the surface of the earth and may be interpreted with respect to their geological meaning.

Several methods and apparatus have been proposed to take advantage of these facts in investigating subterranean strata. In nearly all of the known methods the use of alternating current has been proposed but in every instance the determination of the magnetic field characteristic is limited to the factors of field direction and field intensity. No attempt is made to determine the phase angle variations in such fields. Taking into consideration the fact that all alternating current computations depend upon direct or indirect knowledge of phase angles, it may be safely asserted that the attempt to interpret modifications in the characteristics of an alternating magnetic earth field, without taking into consideration the question of phase angles, must result in incomplete and even incorrect data.

The object of my invention is to provide a novel method and apparatus whereby the complete characteristic of an alternating magnetic earth field may be determined with reference to direction, intensity and phase angle at any point within the field.

In the accompanying drawings I have illustrated diagrammatically how the invention may be carried out, but it will be apparent to anyone skilled in the art that the underlying principle may be embodied in other forms and that variations in detail of the system illustrated may be made without departing from the spirit of the invention.

Fig. 1 illustrates diagrammatically a suitable apparatus for generating subterrenean alternating earth currents; Figs. 2 and 3 illustrate, respectively, two stages of the method and apparatus employed in observing the characteristic of the magnetic field; and Fig. 4 is a chart showing one system of choosing the points of observation.

The alternating magnetic field may be produced in any known or suitable manner, for example, as indicated in Fig. 1, but this does not constitute a part of the present invention, except in combination with the method of observing the magnetic field. As shown in Fig. 1, (and more fully described and claimed in my co-pending application filed May 15, 1925, Serial No. 30,478), a generator 1 is in circuit with primary coil 2 of a transformer having two secondary coils 3, 4. The coils 3, 4 are oppositely wound and connected by wires 5, 6 and 7, 8 with grounded electrodes 9, 10 and 11, 12. By means of variable resistances 13, 14 the currents in the two circuits may be made equal and, because the portions of the circuits above ground are for most of their lengths parallel and close together, and the currents are equal and opposite, the disturbing influence of the local field may be reduced to a negligible minimum. Owing, however, to the positions of the grounded electrodes, the subterrenean paths will be of unequal length and, hence, of unequal resistance, and the ground currents will not be equal. A differential current will result on the basis of which the observations hereafter described may be made.

Referring now to Fig. 2, 21 and 22 represent coils of large diameter having several hundred turns and being separated by a distance from 25 to 500 feet. The coils may be turned in any direction and may be successively connected to an amplifying device 23 and a telephone 24. When the coils are located in an alternating magnetic field of audio frequency, alternating currents of the same frequency will be induced in the coils, amplified in the amplifier 23 and made audible in the telephone 24.

The E. M. F.'s induced in the coils depend upon the number of turns and the geometrical dimensions of the coils as well as the frequency and intensity of the magnetic field in the directions of the axes of the coils. A turning of the coils causes an increase or decrease of the induced E. M. F. yet normally it is not possible to determine by such operations the exact directions of the maximum and minimum field strengths due to the complicated structure of the resulting magnetic earth field.

To explain the manner of determining the maximum and minimum field directions, intensities and phase angles at location II of coil 22, reference is made to Fig. 3. The coils 22 and 21, the latter at location I, are disposed with their axes parallel to any chosen direction and are connected by double wires 25 and 26 to the amplifying device 23, telephone 24 and a measuring arrangement consisting of variable condensers 27 and 30 and variable resistances 28 and 29. The free ends of wires 25 and 26 are connected to the inner ends of variable resistances 28 and 29. Ordinarily a sound will be heard in the telephone, but by varying the condensers 27 and 30 and the resistances 28 and 29, it is possible to balance this bridge arrangement so that the sound will completely disappear.

Provided the coils 21 and 22 have the same number of turns and the same dimensions, the following proportion is valid:

$$\frac{E_I}{E_{II}} = \frac{H_I}{H_{II}}$$

where $E_I$ and $E_{II}$ represent the E. M. F.'s induced in the coils by the field strengths $H_I$ and $H_{II}$. If R and index represents the complex alternating current resistance of the instrument corresponding to the index number, the following equation is valid for the balancing point:

$$\frac{E_I(R_{27}+R_{28})}{R_{21}+R_{25}+R_{27}+R_{28}} = \frac{E_{II}(R_{29}+R_{30})}{R_{22}+R_{26}+R_{29}+R_{30}}$$

or, using the first proportion, $$\frac{H_{II}}{H_I} = \frac{R_{27}+R_{28}}{R_{29}+R_{30}} \cdot \frac{R_{22}+R_{26}+R_{29}+R_{30}}{R_{21}+R_{25}+R_{27}+R_{28}}$$

This equation may be transformed into the expression:

$$\frac{H_{II}}{H_I} = A_{I\,II}\, e^{j\alpha_{I\,II}}$$

where $A_{I\,II}$ is the quotient of field intensity and $\alpha_{I\,II}$ the phase angle difference for locations I and II, while the letters $e$ and $j$ represent generally known mathematical symbols. The values of $A_{I\,II}$ and $\alpha_{I\,II}$ can be obtained by well-known methods of computation.

These calculations require the knowledge of the frequency of the induced currents. Because the frequency can be determined by several well-known methods, this operation is not further described in this invention. Based upon or coincident with such operation either circuit 21, 25, 31, 28, 27 or circuit 22, 26, 31, 29, 30 or both circuits can be tuned to the frequency of the induced currents by means of the variable condensers 27 and 30, thus insuring the highest possible degree of sensitiveness.

After having thus determined the intensity quotient and phase angle difference for certain coil positions at locations I and II, the same operation can be repeated for any other position of coil 22, while the position of coil 21 at location I remains unchanged.

Provided the intensity quotients and phase angle differences are determined for two directions perpendicular to each other at location II, the exact maximum and minimum field direction for the plane of the two measured directions as well as the maximum and minimum intensity quotients and phase angle differences for this plane with reference to the field strength at location I can be derived from these values by well known computation methods.

If only the knowledge of the exact maximum and minimum field direction is required, coil 21 may be moved to location II, placed in a perpendicular position to coil 22 and the same operation and calculation be carried out.

In order to compute the absolute maximum and minimum directions for location II and the absolute maximum and minimum field intensity quotients and phase angle differences in reference to a certain field strength at location I or II, it is necessary to determine the intensity quotient and phase angle difference for a third position of coil 22 vertical to the two other positions.

The same operations and computations can further be repeated for location II and any other location III, coil 22 at location II now being placed in one of the previously investigated positions and coil 21, now at location III, placed successively into two or three positions perpendicular to each other.

The balance equation can then be expressed as:

$$\frac{H_{III}}{H_{II}} = A_{II\,III}\, e^{j\alpha_{II\,III}}$$

where $H_{III}$ represents the field strength at location III and $A_{II\,III}$ and $\alpha_{II\,III}$ the intensity quotient and phase angle difference with reference to location II and III.

In order to compare the measured and computed values it is necessary to refer all results to a standard field strength and preferably to use the same as the unit for all comparisons. For example choosing the field strength H as standard and unit, I can transform:

$$\frac{H_{III}}{H_{II}} = A_{III\,II}\, e^{j\alpha_{II\,III}} \text{ into } \frac{H_{III}}{H_I} = A_{I\,III}\, e^{j\alpha_{I\,III}}$$

where $$A_{I\,III} = A_{I\,II} - A_{II\,III} \text{ and } \alpha^{I\,III} = \alpha^{I\,II} + \alpha^{II\,III}$$

It is easily comprehensible that by using the measuring arrangement and by repeating this method the complete characteristic of an alternating magnetic field may be determined at any point within the field. For example, in order to investigate a certain area a number of profiles or cross sections are measured as shown in Fig. 4. If the profiles are measured from east to west it is necessary to run one profile from north to south in order to connect the different east and west profiles with each other; and vice versa.

After having thus determined the field characteristic for different points, lines of equal maximum and minimum magnetic field direction, intensity and phase angle, the latter two with reference to the chosen standard intensity and phase angle, may be interpolated, plotted and their irregularities interpreted with reference to their probable geological meaning.

I claim:

1. The method of ascertaining the characteristics of an alternating magnetic field, which consists in receiving induced currents in two or three directions perpendicular to each other at one or two locations in said field, measuring the frequency of said currents, balancing said currents by means of variable impedance devices of known values, calculating the intensity quotients and phase angle differences for said directions by means of the data thus obtained and computing from these values the maximum and minimum field directions and maximum and minimum field intensity quotients and phase angle differences for the points of observation.

2. The method of investigating subterranean strata which consists in generating subterranean alternating currents, receiving induced currents from the resulting magnetic field in two or three directions perpendicular to each other at one or two locations in said field, measuring the frequency of said currents, balancing said induced currents by means of variable impedances of known value, calculating intensity quotients and phase angle differences for said directions by means of the data thus obtained, computing from these values the maximum and minimum field direction and the maximum and minimum field intensity quotients and phase angle differences for the points of observation, and repeating the foregoing steps with reference to a plurality of other localities, thus accumulating data from which the magnetic field as a whole may be charted.

3. Apparatus for exploring an alternating magnetic field comprising two exploring antennæ, a common indicator of alternating current in circuit with said antennæ, a bridging device shunted around said indicator and having its bridging elements connected to the main circuit between said antennæ, said bridging device having variable impedance elements of known value in its branch arms, whereby one or both of the antennæ circuits may be tuned to the frequency of the induced currents for the highest possible degree of sensitiveness and whereby the effects of the said currents may be balanced in said indicator and the intensity quotient and phase angle difference of the magnetic fields inducing said currents may be calculated from the known constants of the circuits.

The foregoing specification signed at New York, N. Y., this 11 day of January, 1927.

THEODOR ZUSCHLAG.